(12) United States Patent
Powell, Jr. et al.

(10) Patent No.: US 7,568,109 B2
(45) Date of Patent: Jul. 28, 2009

(54) SYSTEM FOR SOFTWARE SOURCE CODE COMPARISON

(75) Inventors: G. Edward Powell, Jr., Brentwood, TN (US); Michael Anderer, Salt Lake City, UT (US); Mark T. Lane, Franklin, TN (US); N. Edward White, Austin, TX (US)

(73) Assignee: IPX, Inc., Brentwood, TN (US)

( * ) Notice: Subject to any disclaimer, the term of this patent is extended or adjusted under 35 U.S.C. 154(b) by 601 days.

(21) Appl. No.: 10/938,844

(22) Filed: Sep. 13, 2004

(65) Prior Publication Data

US 2005/0216898 A1 Sep. 29, 2005

Related U.S. Application Data

(60) Provisional application No. 60/502,098, filed on Sep. 11, 2003.

(51) Int. Cl.
*G06F 21/00* (2006.01)
(52) U.S. Cl. .................... 713/187; 726/32; 713/189
(58) Field of Classification Search .............. 726/32
See application file for complete search history.

(56) References Cited

U.S. PATENT DOCUMENTS

| | | | |
|---|---|---|---|
| 6,182,067 B1* | 1/2001 | Presnell et al. ............ 707/5 |
| 6,549,216 B1 | 4/2003 | Schumacher et al. | |
| 6,658,626 B1* | 12/2003 | Aiken .................. 715/205 |
| 6,778,995 B1* | 8/2004 | Gallivan ................ 707/102 |
| 6,789,084 B2 | 9/2004 | Rorvig et al. | |
| 6,954,747 B1* | 10/2005 | Wang et al. ............. 706/54 |
| 2003/0036945 A1 | 2/2003 | Del Vecchio et al. | |

FOREIGN PATENT DOCUMENTS

EP 0 404 505 12/1990

OTHER PUBLICATIONS

Verco K . L. et al.; "Plagiarism a la Mode: Comparison of Automated Systems for Detecting Suspected Plagiarism"; Computer Journal, Oxford University Press, Surrey, GB, vol. 39, No. 9, Jan. 1, 1996; pp. 741-750.

* cited by examiner

*Primary Examiner*—Gilberto Barron, Jr.
*Assistant Examiner*—Martin Jeriko P San Juan
(74) *Attorney, Agent, or Firm*—McKenna Long & Aldridge LLP

(57) ABSTRACT

A system for analyzing similarities between a first and second corpus or between a set of concepts and a corpus uses natural language processing and machine intelligence methods to replace terms or phrases in the corpus with concepts, determine the frequency of each concept in the corpus, and convert the corpus into a concept frequency file to enable easy comparison of the two corpuses or easy retrieval of items from the corpus that contain concept. Difference analysis and a combination of content and spectral analysis may be employed.

3 Claims, 7 Drawing Sheets

STRUCTURE

|  | SAME | DIFFERENT |
|---|---|---|
| SAME | 101<br>SHELL/SCRIPT<br>GREP<br>DIFF<br>COMM | 102<br>CONTENT<br>ANALYSIS<br>RAREWORD<br>SEARCHES |
| DIFFERENT | 103<br>SPECTRAL<br>ANALYSIS<br>SIMILARITY<br>MATCHING | 104<br>HUMAN<br>INTELLIGENCE<br>IP THREAD<br>ANALYSIS |

CONTENT

FIG. 1

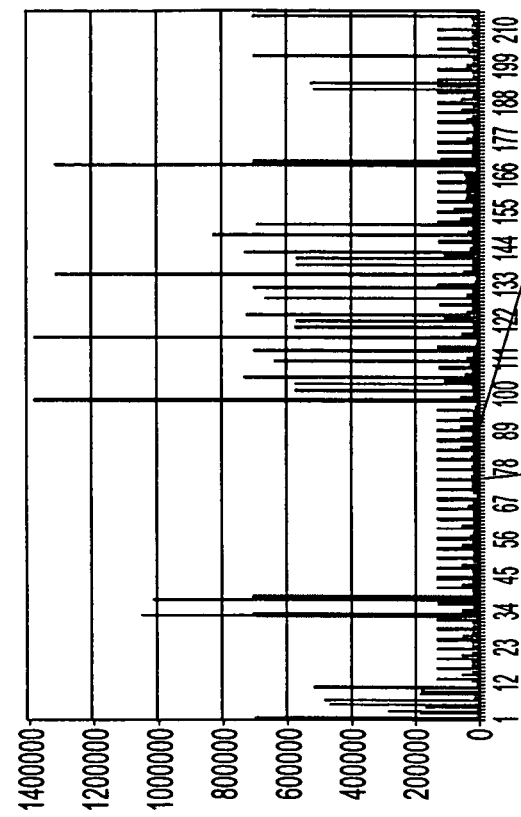
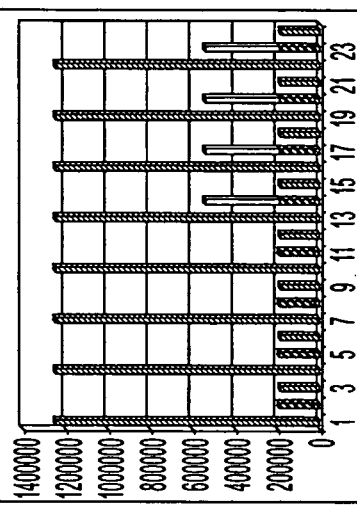
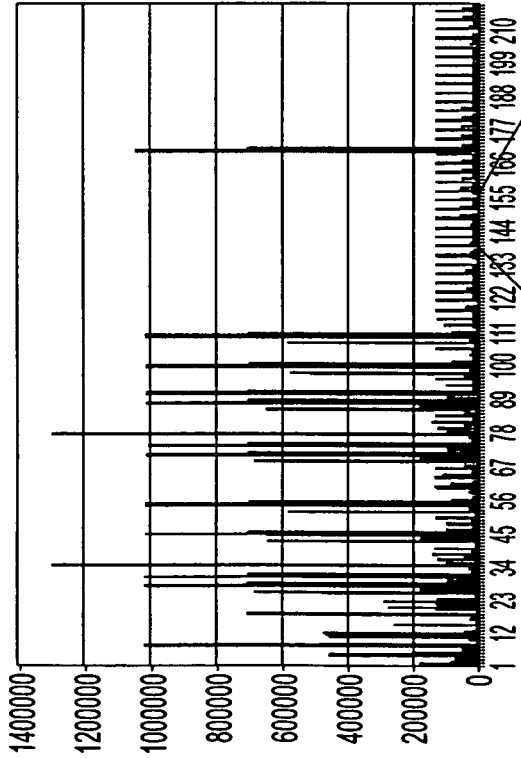
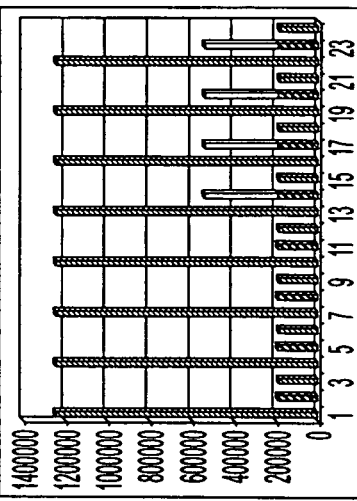
FIG. 3B

| | NEUROMODULATION | "BRAIN IMAGE" | "CORD STIMULAT" | "NERVE STIMULAT" | "VIVO MAGNETIC RESONANCE" | ("INTERVENTIONAL MAGNETIC RESONANCE" OR "INTERVENTIONAL MR") | "BRAIN STIMULAT" | "INTRALAMINAR NUCLE" | ("SYMPATHETIC OR PARASYMPATHETIC) | "CORPUS CALLOSUM" |
|---|---|---|---|---|---|---|---|---|---|---|
| "NEUROMODULATION" -232 | 100.00% | 4.31% | 14.22% | 34.48% | 0.00% | 0.00% | 12.93% | 1.29% | 24.57% | 0.00% |
| "BRAIN IMAG" -565 | 1.77% | 100.00% | 0.53% | 2.65% | 1.59% | 0.71% | 5.13% | 1.42% | 2.12% | 3.36% |
| "CORD STIMULAT" -266 | 12.41% | 1.13% | 100.00% | 43.61% | 0.00% | 0.00% | 22.56% | 0.75% | 25.94% | 0.00% |
| "NERVE STIMULAT" -1750 | 4.57% | 0.86% | 6.63% | 100.00% | 0.11% | 0.00% | 6.91% | 0.23% | 21.94% | 0.23% |
| "VIVO MAGNETIC RESONANCE" -115 | 0.00% | 7.83% | 0.00% | 1.74% | 100.00% | 1.74% | 0.00% | 0.00% | 5.22% | 0.00% |
| ("INTERVENTIONAL MAGNETIC RESONANCE" OR "INTERVENTIONAL MR") -95 | 0.00% | 4.21% | 0.00% | 0.00% | 2.11% | 100.00% | 2.11% | 0.00% | 0.00% | 0.00% |
| "BRAIN STIMULAT" -387 | 7.75% | 7.49% | 15.50% | 31.27% | 0.00% | 0.52% | 100.00% | 4.13% | 9.56% | 2.58% |
| "INTRALAMINAR NUCLE" -16 | 18.75% | 50.00% | 12.50% | 25.00% | 0.69% | 0.00% | 100.00% | 100.00% | 0.00% | 6.25% |
| ("SYMPATHETIC OR PARASYMPATHETIC) -872 | 6.54% | 1.38% | 7.91% | 44.04% | 0.69% | 0.00% | 4.24% | 0.00% | 100.00% | 3.90% |
| "CORPUS CALLOSUM" -114 | 0.00% | 13.19% | 0.00% | 2.78% | 0.00% | 0.00% | 6.94% | 0.69% | 23.61% | 100.00% |

FIG. 4

SYSTEM FOR SOFTWARE SOURCE CODE COMPARISON

This application claims the benefit of U.S. Provisional Patent Application No. 60/502,098, filed on Sep. 11, 2003, which is hereby incorporated by reference for all purposes as if fully set forth herein.

BACKGROUND OF THE INVENTION

1. Field of the Invention

The present invention relates to data object comparison and analysis, and in particular to software for comparing two or more data objects to determine the extent of any similarities between them.

2. Discussion of the Related Art

Companies increasingly rely on software to provide not only products for consumers or their institutions, but also to manage their day-to-day operations. Software code has therefore become a valuable intellectual property (IP) asset.

The ever-increasing complexity of computer software programs as well as tight development schedules force programmers to become more efficient. One way for programmers to meet these challenges is by reusing source code and adapting it to new applications rather than writing the source code from scratch.

To this end, open source software has become increasingly popular. Open source software is software source code that is publicly available and freely downloadable from the Internet. Thus, open source software code is a convenient resource for programmers looking to cut development time by downloading it and merging it with their proprietary application. In addition, the growth of the open source software movement may also motivate computer programmers to donate or contribute software to the open source movement that they have written but that is owned by their employer. The problem is that most open source software, while freely available for downloading is not in the public domain.

In particular, open source software is not unrestricted—to the contrary it is often subject to licenses that restrict not only the open source software code itself but any modification thereof and any software that incorporates it as well. Typically, these open source licenses may require that the source code of any proprietary system using some open source software code be publicly disclosed. In other words, a programmer who uses open source code in a proprietary application may unintentionally subject that proprietary application to the constraints and restrictions of an open source license. This may have devastating affects on the ability of the company to protect software IP or pursue further intellectual property protection for their software.

In addition, open source software has another inherent risk—it is unknown to what extent open source software incorporates proprietary technology owned by others. Thus, even if open source software is free of any licensing restriction, such as open source software that is in fact committed to the public domain, the possibility remains that the software may infringe another's patents or property rights. A programmer who incorporates this open source code into their proprietary application may unintentionally subject his employer to unforeseen consequences such as infringement litigation.

Furthermore, the rapid growth of the software industry has driven many programmers and software engineers to change employers regularly and often. There is a problem that as these workers move between jobs, they may be taking proprietary source code that they wrote for a previous employer with them to their new employment. Programmers may not be aware or may not be sensitive to these concerns, and risk an inadvertent technology transfer or intellectual property transfer.

In addition, as companies increasingly rely on overseas or offshore development firms for software programming, there is a concern that the overseas development company may be reusing source code that it wrote for one client (who has rights to that software) for projects it works on with other clients.

The problem is not limited to computer source code. In addition to source code, design documents and technical specifications may be indicative of patent infringement or may be used to invalidate patents. But due to the relative ambiguity of terms of art in the software and business methods fields as well as the non-technical nature of language that is often used in patents, it is very difficult to assess IP risks properly and efficiently.

These IP risks are more serious given the tight regulatory environment in which companies operate. Corporate regulations, such as those collectively known as "Sarbanes-Oxley", require that firms monitor their intellectual property assets as well as the financial risks to their business perform regular IP and risk audits, and report the same to their shareholders, regulators, and the public.

But given that programmers often modify source code slightly when reusing it, it becomes difficult to perform IP software risk audits using redline or other character-based comparison methods. Thus, what is needed in the art is a multi-dimensional approach to comparing two or more corpuses, such as source code, documents, file objects, collections of data or file objects, or databases, that is able to determine the extent to which one corpus resembles another even when the particular structure or content of the two corpuses vary.

SUMMARY OF THE INVENTION

Accordingly, the present invention is directed to a system for software source code comparison that substantially obviates one or more of the problems due to limitations and disadvantages of the related art.

An advantage of the present invention is to provide a system for comparing two corpuses to determine how they resemble one another.

Another advantage of the present invention is to provide a system, software, and methods for analyzing at least two corpuses and determining concepts contained in each and further determining the extent to which the corpuses contain concepts in common.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system for comparing at least a first corpus to a second corpus includes a profiler that characterizes each of said first corpus and second corpus; an encryption engine respectively encrypting the first corpus and the second corpus using a one-way transform; an analyzer identifying concepts in the transformed corpuses, said analyzer determining a frequency rating of said concepts in each corpus, replacing each instance of each of said concepts on every line with its respective frequency rating to create a frequency file;

and a comparator comparing the frequency file for the first corpus to the frequency file for the second corpus.

In another aspect of the present invention, a system for searching a corpus of data objects includes: receiving a list of concepts; relating at least one of said concepts to at least one search term; searching each of said data objects for each of said terms; and determining the correlation of at least one concept and at least a second concept in said corpus of data objects based on the presence of search terms relating to said first and search terms relating to said second concept in the same data object.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a diagram illustrating an aspect of a first exemplary embodiment of the present invention.

FIG. 3B illustrates sample spectral extracts according to an aspect of a first exemplary embodiment of the present invention.

FIG. 4 illustrates a sample correlation matrix according to an aspect of a first exemplary embodiment of the present invention.

DETAILED DESCRIPTION OF THE ILLUSTRATED EMBODIMENTS

Figure 2A:
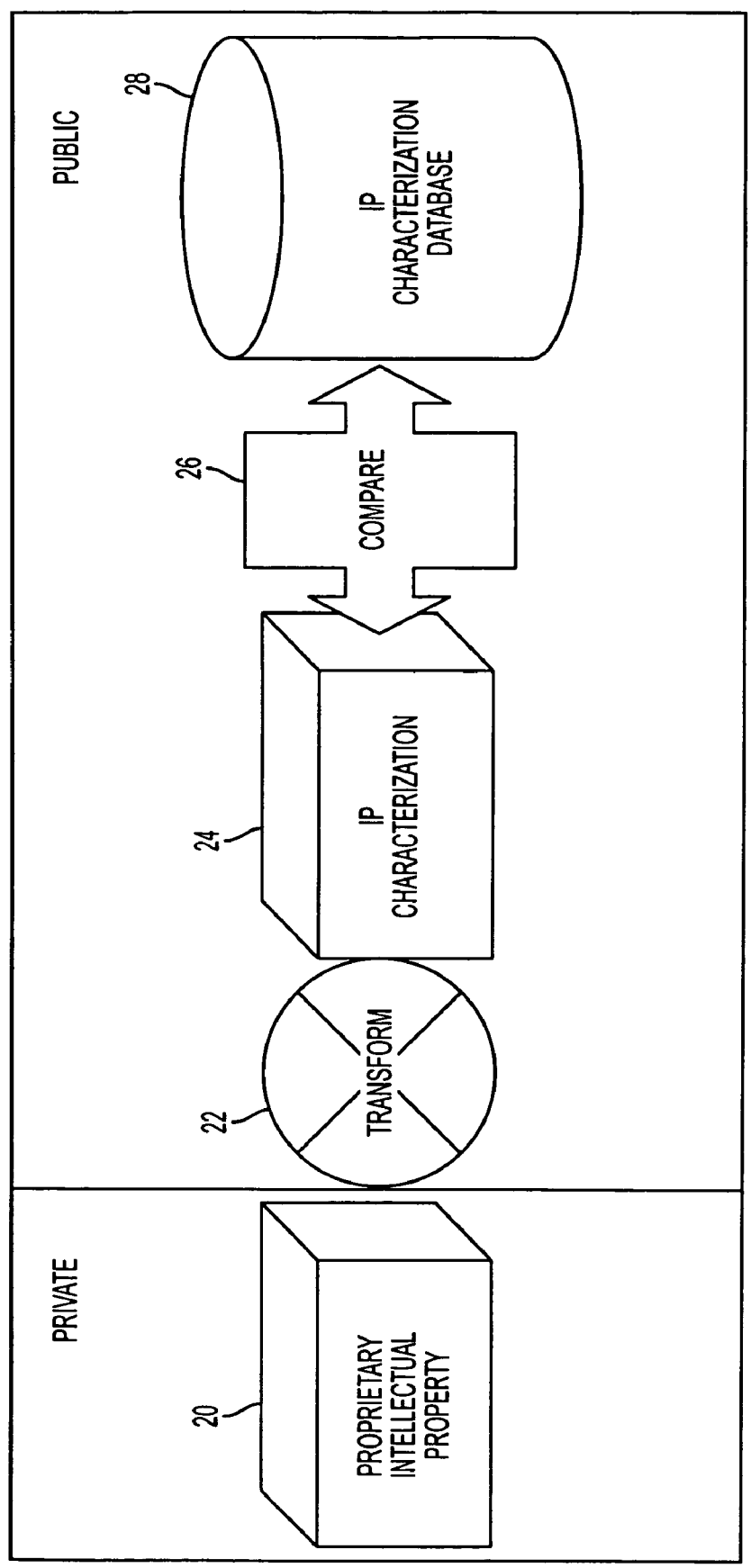
FIG. 2A is a process diagram illustrating the system of the present invention according to a first exemplary embodiment.

Reference will now be made in detail to embodiments of the present invention, examples of which are illustrated in the accompanying drawings.

The system of the present invention models the conditional probability that two (or more) corpuses have a similar combination of characteristics. For example, the two corpuses may be software source code bases composed of source code files, structured or unstructured documents, patents, or technical disclosures. The characteristics analyzed may be the structure and content of those code bases and source code files, for example.

The system of the present invention analyzes and compares the corpuses in such a way that they may be preprocessed without affecting the comparison. In one exemplary embodiment, the corpus is transformed using any one of a number of one-way transforms understood to those of ordinary skill in the art, allowing the system of the present invention to protect the proprietary, secure, confidential, or privileged nature of the corpus and still allow it to be compared against another corpus. In the alternative, proprietary one-way encryption transforms may be used.

For example, the present invention allows an owner of proprietary code to submit their code to a website which compares the code against a database of open source code bases. The database of open source code bases may be an open source UNIX or Linux distribution, for example. In this capacity, the system of the present invention would be used for auditing proprietary code to determine if it contained open source software, or if a particular open source software release contained proprietary software. This audit could be scheduled to run on a periodic basis automatically.

In another aspect, the database of open source code bases may contain a number popular open source applications of a certain type, such as image manipulation or audio processing applications that may be protected by trade secrets or patents. In this aspect, the input file may be patent claims or design specifications containing concepts that are compared against the concepts in the source code in the database. Thus, while the structure of the two corpuses is different (patent claims on the one hand and source code on the other) it is still possible according to the system of the present invention to determine whether they share concepts in common.

In these aspects of the invention, the need to keep the proprietary corpus confidential is paramount. Thus, providing a one-way transform of the proprietary corpus, using some form of or combination of natural language processing, machine learning, and data encryption, minimizes the risk of inadvertent disclosure of proprietary information. It is necessary that the transform be one way (i.e. irreversible) to protect the confidentiality of the corpus against the risk that the system on which the comparison is run is compromised in some way, or that the corpus is intercept en route.

As noted earlier, the system is not limited to comparing source code. The system may be adapted to compare compiled object code as well, which is important in case of reverse engineering or infringement of copyrights to software. Furthermore, the system may be adapted to corpuses other than computer code.

For example, in another exemplary embodiment, the system of the present invention may take search phrases for comparison against a target corpus of patents, or patent claims for use in a patent search. As discussed earlier, the system parses the search terms for concepts based on natural language processing methods, and assigns raw power values based on the frequency of the concept in the target corpus. In a further aspect, the system may analyze each file in the target corpus (each patent in a patent database, for example), and replace each instance of each concept in the specifications with that concept's respective power. In addition, or in the alternative, the concept may be replaced by its power in the claims, in the case of an infringement analysis.

In a first exemplary embodiment the present invention allows one corpus to be compared against at least one other corpus. As noted, a corpus may be any data object, file object, collection of data or file objects or any type of structured or unstructured data or documents. This includes source code files including both instructions and comments, object code, text documents, structure documents such as spreadsheets, word processing files, HTML or XML documents, or databases or collections thereof.

In a first aspect of this invention, a first corpus (the source corpus) is profiled and converted into a metadata file. Likewise, the second, or target, corpus is profiled and converted into a target metadata file. In this particular aspect, the profiling process includes encrypting or otherwise transforming the corpus using a one-way transform, and then characterizing the transformed corpus before converting it into a metadata file.

FIG. 2A is a block diagram generally illustrating a system for comparing two corpuses according to the present invention. Proprietary intellectual property is taken at step 20 as input and transformed at step 22 using natural language processing, machine intelligence, and encryption. At step 24, the transformed proprietary property is characterized as discussed herein and compared at step 26 with one or more other characterized corpuses in the characterization database 28. The profiling tool may perform multi-source characterizing and a one-way transform. By making the transform a one-way transform the system will protect the proprietary nature of the source code. If the source code could be reverse engineered from the metadata file, very few companies with proprietary source code would want to use the system for fear of disclosing their source code to others. By making it a one-way transform, they may be comfortable that their confidential information and source code will be kept confidential.

Software source code B is taken as input at step 21 by a profiling block 23 which performs profiling on the source code to produce a metadata file B at step 25. The metadata files are then compared to one another at step 26 and a report is generated at step 27. The report will reflect how closely the two pieces of software resembled one another.

More particularly, the process of profiling the corpus involves a multi-source characterization of that corpus along with a one-way transform assigned to preserve the confidentiality, secrecy and integrity of that original code document. Because the corpus may contain trade secrets or other proprietary intellectual property information, it may be necessary to use cryptographic methods to convert that corpus, which is readable by anyone, into a form that is only readable and useful by the system of the present invention and such that the conversion may not be reversed. This protects against the risk that the original corpus may be reverse engineered from the transformed corpus.

After the two corpuses are profiled and converted into respective source and target metadata files, then the two metadata files are compared to determine how closely they resemble each other. The details of the multi-source characterization and the comparison will be discussed below.

In further aspect of the first exemplary embodiment, the corpus is characterized by a structure and content. In other words, any data object or file object will contain some inherent structure that organizes the content stored within it. Thus, it is possible for two corpuses such as source code files, for example, to have both similar structure and content, different structure and content, similar structure with different content, or different structure with similar content. A two-by-two matrix showing the possible scenarios is illustrated in FIG. 1.

FIG. 1 illustrates the possible relationships between two corpuses. The system of the present invention can perform a number of different analyses on two corpuses to determine whether they resemble one another. For example, to determine whether the two corpuses share content and structure as noted in quadrant 101, ordinary text comparison programs such as redline applications or text comparison commands, such as the grep, diff or comm commands found in the UNIX operating system, may be used. This will reveal whether or not sections of the corpus are identical in structure and content.

However, a content analysis as noted in quadrant 102 can also be done to determine whether the content of two corpuses is similar even though their structure may differ. The content analysis may use rare word searches to accomplish this function. In the embodiment discussed earlier with respect to source code files and computer programming, while computer programming languages have certain reserved words that are likely to be found in any source code file written in that language, it is not likely that variable names, function names, procedure names or comments will be shared across source code files unless they were written by the same person or unless one was written with the knowledge of the other. Thus, the variable name, function name, procedure name or comment could be the rare word that is searched for in both corpuses. If the rare word is found in both, then it is likely that portions of source code were copied but simply altered in their structural position in the document. For example, if one code file uses an "if-then" statement and another corpus uses a "case" statement, but the variables are the same in the two code files, then the resemblance will be detected by the content analysis using rare word searches. This may reveal that the second corpus code file was written with the in the presence of or with the knowledge of first corpus, that the second corpus was written by someone who also wrote the first corpus, or that the second corpus is simply a rewrite of the first corpus.

Furthermore, and as illustrated in FIG. 1 at quadrant 103, while two corpuses may have the same structure, they may have different content. In this case, the system of the present invention may perform a spectral or histogram analysis to determine whether certain concepts are found in both documents despite being identified by different terms in the source code file. Thus, in the case of source code, structure could be an "if-then" statement used in both code files. However, if the two code files different variable names within this same structure, the resemblance will not be detected either by a strict textual analysis or content analysis using rare word searches. However, the spectral analysis 103 will detect the presence of similar structure where the rare words, in this case the variable names, are different.

Finally, there may be instances that fall into the fourth quadrant 104 of FIG. 1, where both the structure of the document and the content of the document are different. This is where it is necessary to provide human IP or intellectual property thread analysis. In other words, human readable documents such as manuals, read-me files, message board postings, news group postings, chat transcripts, resumes, press releases, journal articles, and marketing materials or the like are reviewed to determine whether people involved in creating the first corpus were at a different time with working with the company that wrote the second corpus. In the alternative, such documentary analysis may reveal that authors of the first and second corpus knew each other, were familiar with one another, or those working or somehow came in contact with each other.

Figure 2B:
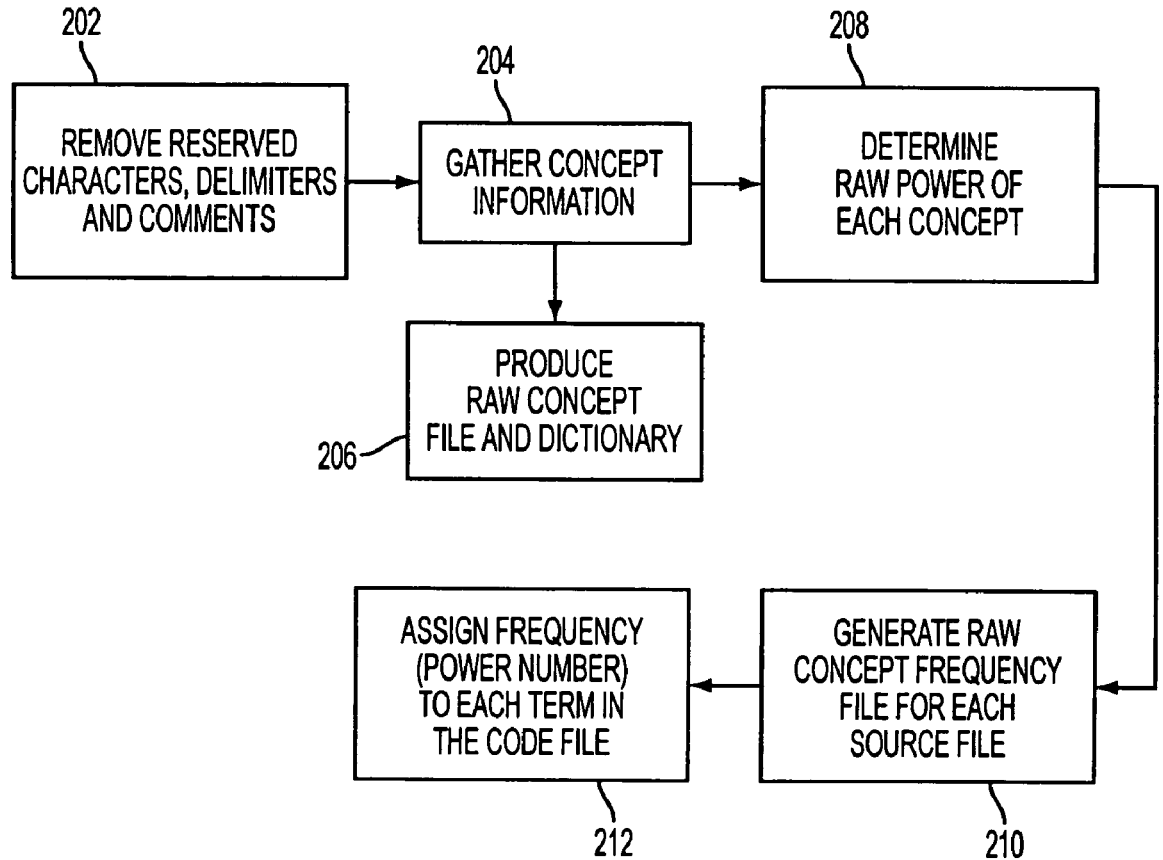
FIG. 2B is a process diagram illustrating profiling according to a first exemplary embodiment of the present invention.

The spectral analysis will now be discussed in detail. In an aspect of the first exemplary embodiment, the corpuses being compared are source code. To characterize source code according to the present invention, each file in the code base is processed as illustrated in FIG. 2B. The processing involves stripping away any comments, white spaces or programming language-specific characters, such as the asterisk, the ampersand, semicolon, comma, for example, in step 202. It is understood by one of ordinary skill in the art that a different type of corpus such as a text document, XML document or HTML document will have different characters that are specific delimiters in that type of corpus.

After this information has been removed, at step 204, concept information is gathered from the source code files in the code base corpus. Concept information is gathered by first producing a raw concept file at step 206 which retains the line structure and that records the concepts in those lines in a dictionary file. Next, the raw power of each concept is determined at step 208. The raw power is the number of times that the concept is used in the entire code base.

After the raw power of each concept in the code base is determined, a raw concept frequency file for each source file in the code base is produced at step 210. This raw concept frequency file records the concepts on each line of the file by replacing the concepts on the line with their respective raw power values. After step 210, the system of the present invention according to this particular exemplary embodiment assigns a frequency or power number to every term used in the code file at step 212.

Thus, for each line in the file each concept is translated into the power of that concept from the corpus dictionary that was created earlier. For example, a line containing a number of different concepts would be replaced by a sequence such as 2363:12:300:41, for example, in which the numbers are the power numbers of the concepts and the colons are delimiters used to separate different concepts on the same line.

Figure 3A:
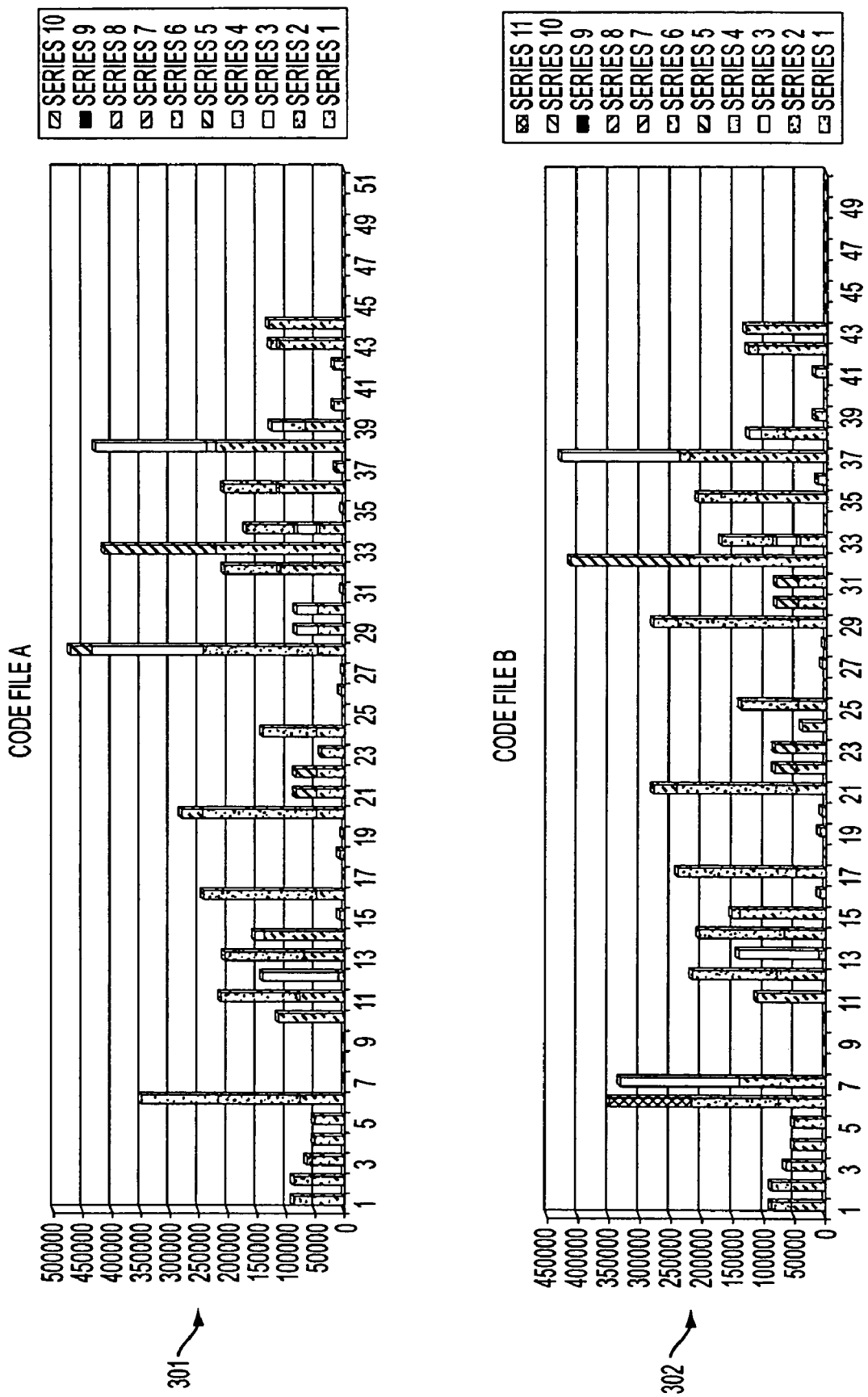
FIG. 3A illustrates sample histograms according to an aspect of a first exemplary embodiment of the present invention.

After this stage, spectral summary charts may be created as illustrated in FIG. 3A. The spectral summary chart reports on the similarities between the two code files A and B by providing graphs 301 and 302 of the histograms or spectrum of each of code files A and B, respectively, based the name of the file, the number of files and number of lines in the file, the number of distinct concepts used in the file and the total power of the lines in the file. This can then be plotted and displayed in an ordinary bar chart format as illustrated in FIG. 3 in which the horizontal axis is the line number of the file and the vertical axis is the total aggregate power of that line from the concept dictionary. By looking at the or spectral charts of the two files being compared, one can see immediately whether or not the files contain similar concepts because each line in each file will be replaced by a bar on which the concept values in that line are plotted. The similarities between the two files become obvious.

Furthermore, as illustrated in FIG. 3B, a spectral extract can be obtained in which portions of a histogram from one file can be compared against the histogram of the other file to see if there are sections of the histograms that match exactly. This can be used to determine whether or not entire sections of source code were duplicated in concept if not in precise exact character matching. In other words, because source code that accomplishes the exact same thing can be written in different ways, it is necessary to determine to what extent the source code is written using the same variable names, the same functions and the same order or using the same programming styles which under ordinary circumstances would differ significantly from one programmer to another. Thus, if sections of the code display similar identical concepts, it is very likely that source code has been duplicated and only modified slightly.

In a further embodiment of the present invention, the content analysis and spectral analysis may be further extended to analyze patents and patent claims for invalidity or infringement purposes. In other words, while an intellectual property document such as a patent or a design specification may include terms used to convey a concept, it is understood that there are other terms that may be used as synonyms for that same concept. This is particularly the case in software and business method patents where there are few industry standard terms of art, or in which the terms of art have ambiguous meanings and are used loosely by those in the art.

Thus, the system for the present invention may have at its disposal a corpus dictionary that is either predefined for a specific field of knowledge in which the corpus (the patent, in this example) resides or it may have a dictionary that is constructed ad hoc as part of the analytical process using the first and second corpus to produce the corpus dictionary of key concepts.

In addition, the concepts may be used to determine the extent to which concepts are highly correlated in a corpus. Consider an example in which the correlation of a number of biomedical concepts in patents is sought. In this example, ten concepts 400, "neuromodulation", "brain imag*", "cord stimulat*", "nerve stimulat*", "vivo magnetic resonance", "Interventional Magnetic Resonance or Interventional MR", "brain stimulat*", "intralaminar nucle*", "sympathetic or parasympathetic", and "corpus callosum", are entered into system of the present invention. (The * denotes a wildcard operator). The system, using natural language processing methods understood in the art, searches a set of patents or all patents for instances of the concepts (using terms from the concept dictionary synonymous with the concept). The system returns a grid such as that illustrated in FIG. 4, with the concepts 401 listed vertically along the left side and the correlated concepts 402 listed along the top. The number of patents 403 found containing each concept is returned and displayed along with the concept 401 at the left. Then the system correlates each concept with each of the other concepts and displays as a percentage 404 of the total patents 403 found containing the first concept alone the number of patents containing both search terms together. If implemented as a hypertext document or world-wide-web page, the percentage 404 can be selected to reveal the list of the patents having the respective concepts.

This embodiment is not limited to a two dimensional grid. In alternative aspects of this embodiment, a multidimensional array N1×N2× . . . ×Ni returns the correlation of any of concepts 1 though i with any number greater than or equal to two of the other concepts 1 though i. Conceptually, a 10×10×10 cube would store the correlations of three of the ten concepts listed above. It will be understood to those of skill in the art at the time of the invention that the system of the present invention may be implemented in any number of ways.

Figure 5:
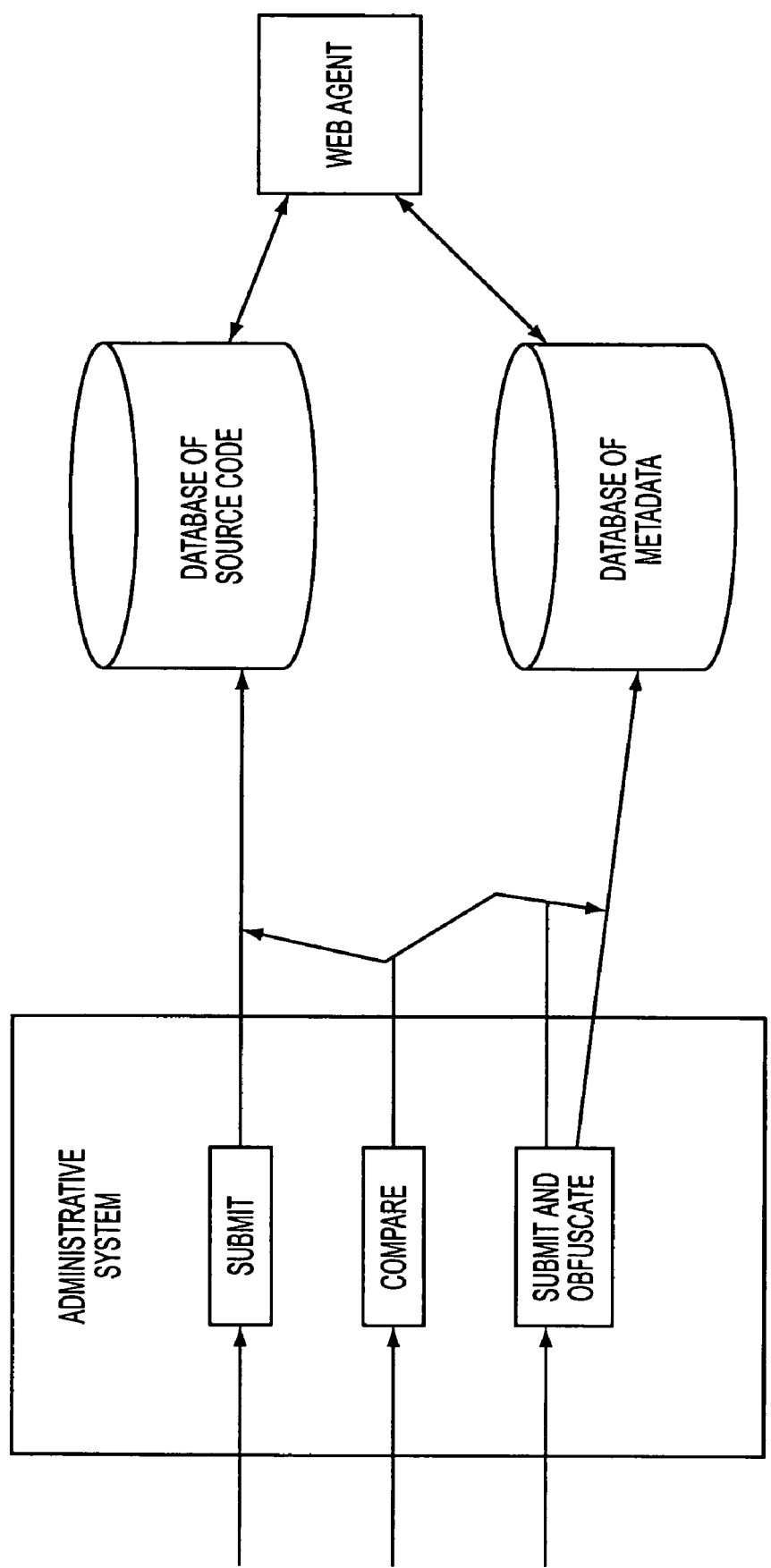
FIG. 5 illustrates a further embodiment of the present invention.

For example and as illustrated in FIG. 5, the present invention may be implemented as a site on the internet which aggregates publicly available documents on the internet, such as source code or patents, onto databases residing on its own system which are used for the comparison. In another example, the present invention may periodically access open source code bases or patent databases across the internet and compare them against proprietary code that is stored on its databases and servers to provide periodic IP monitoring and auditing.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system for comparing at least a first corpus to a second corpus, comprising:

an analyzer identifying concepts in the corpuses, said analyzer determining a frequency rating of each of said concepts in each corpus;

for each corpus, replacing each instance of each of said concepts with its respective determined frequency rating to create a frequency file; and a comparator comparing the frequency file for the first corpus to the frequency file for the second corpus, wherein said comparing the frequency file for the first corpus to the frequency file for the second corpus further comprises comparing portions of one corpus against the other corpus.

2. The system of claim 1, further comprising an encryption engine respectively encrypting the first corpus and the second corpus using a one-way transform, and wherein the analyzer is an analyzer identifying concepts in the encrypted corpuses.

3. The system of claim 2, wherein said encryption engine, analyzer, and comparator are computer programs running on at least one general purpose computer.

* * * * *